United States Patent [19]

Baker et al.

[11] 4,233,630
[45] Nov. 11, 1980

[54] CIRCUIT FOR MODIFYING THE IF RESPONSE OF A TELEVISION RECEIVER

[75] Inventors: Roy F. Baker, Franklin Park; Frank Banach, Oak Lawn, both of Ill.

[73] Assignee: Zenith Radio Corporation, Glenview, Ill.

[21] Appl. No.: 72,397

[22] Filed: Sep. 4, 1979

[51] Int. Cl.³ ............................................. H04N 5/21
[52] U.S. Cl. .................................... 358/167; 358/188
[58] Field of Search .................. 358/188, 167, 160, 38

[56] References Cited
U.S. PATENT DOCUMENTS 2,980,765   4/1961   Holloway ............................ 358/167

Primary Examiner—Richard Murray

[57] ABSTRACT

A "walking circuit" for modifying the IF frequency response of a television receiver is disclosed. The walking circuit includes an amplifier having a pair of selectable gain-degeneration impedances, one such impedance providing the amplifier with a wide band frequency response and the other providing the amplifier with a frequency sensitive response whose peak is centered at the IF frequency of the picture carrier. A current-steering circuit, responsive to the level of the signal received by the receiver, selects the wide band degeneration impedance by steering current through it when high level signals are received so that the amplifier does not modify the IF frequency response. When low level signals are received, current is steered through the frequency sensitive degeneration impedance for modifying the IF frequency response such that maximum gain occurs at or near the IF frequency of the picture carrier.

10 Claims, 3 Drawing Figures

CIRCUIT FOR MODIFYING THE IF RESPONSE OF A TELEVISION RECEIVER

BACKGROUND OF THE INVENTION

This invention is directed generally to improvements in television receivers, and particularly to an improved network for altering the IF (intermediate frequency) response of a television receiver under weak signal conditions.

Television receivers include an IF amplifier which is generally provided with a bandpass characteristic in which the picture carrier (45.75 MH$_2$) is positioned on one slope of the bandpass characteristic and about 6 db (decibels) below the peak response. The chroma subcarrier is typically positioned on the opposite slope of the bandpass characteristic and also about 6 db below the peak response.

Under normal signal conditions, the frequency response described above provides satisfactory results. However, under weak signal conditions, it has been found to be advantageous to modify the IF amplifier's frequency response such that the picture carrier is positioned at or near the peak response of the IF amplifier. The modified frequency response reduces picture detail, but the picture is generally "noisy" anyway under weak signal conditions so that picture detail would not readily be seen. The resultant picture is, nevertheless, subjectively more pleasing than one produced from an unmodified IF frequency response.

In the past, the IF frequency response has been modified or "walked" by including an additional tuned circuit downstream of the IF amplifier. The latter circuit is tuned to the picture carrier frequency and is designed to have a low Q (wide bandpass) under normal signal conditions and a high Q (narrow bandpass) under weak signal conditions. Hence, under normal signal conditions, the over-all frequency response of the IF amplifier is not changed substantially because of the wide bandpass of the additional tuned circuit. However, when signal strength decreases, the higher Q of the additional tuned circuit causes the picture carrier to be positioned at the peak of the over-all frequency response. The bandwidth of the over-all frequency response is also reduced by the effect of the high Q associated with the additional tuned circuit. A "walking" circuit of this type is disclosed in U.S. Pat. No. 3,872,387, assigned to the assignee of the present invention.

Although the walking circuit disclosed in the above-mentioned patent provides improved television performance, it has been found that even better performance results when the over-all bandpass is not narrowed when the picture carrier is elevated to the peak of the frequency response characteristic. In addition, the walking circuitry employed in the above-mentioned patent requires an extra transistor and is not readily manufacturable in integrated circuit form.

Other attempts have been made to "walk" the IF frequency response by a circuit which relies on changing the input impedance of a transistor to change the frequency response of a tuned circuit. The problem with the latter arrangement is that the input impedance of transistors of even the same type varies from unit to unit. Hence, inconsistent frequency response characteristics result.

Thus, prior IF "walking" techniques suffer from inconsistent results, an IF bandpass which is narrower than desired, or the inability to be easily integrated or manufactured inexpensively.

OBJECTS OF THE INVENTION

Accordingly, it is a general object of the invention to provide an improved IF walking circuit.

It is a more specific object of the invention to provide such a circuit which provides a consistent frequency response characteristic wherein the picture carrier is elevated to the peak of the frequency response characteristic without substantially narrowing the IF bandpass.

It is a further object of the invention to provide an IF walking circuit which is inexpensive, easily integratable, and which provides consistent results.

BRIEF DESCRIPTION OF THE FIGURES

The objects stated above and other objects of the invention are more particularly set forth in the following detailed description and in the accompanying drawings of which.

DESCRIPTION OF THE PREFERRED EMBODIMENT

Figure 1:
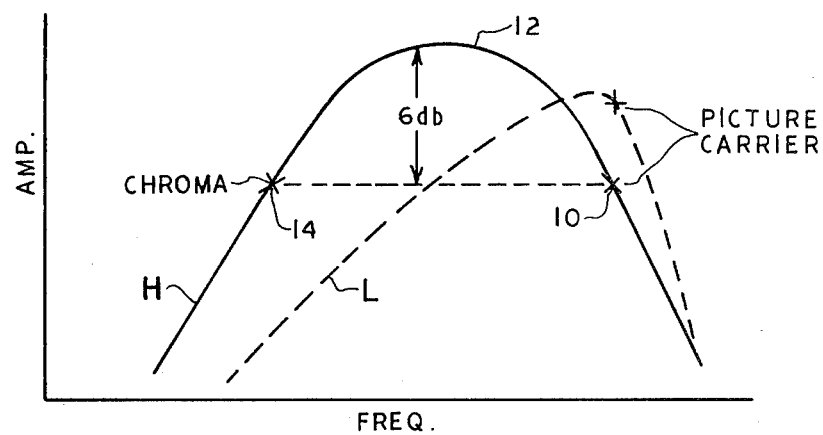
FIG. 1 illustrates conventional IF frequency response characteristics under high level and low level signal conditions.

To illustrate the way in which an IF frequency response has been conventionally modified, reference is made to FIG. 1. The curve H depicts the customary IF response of a color television receiver under normal or high level signal conditions, i.e., under conditions wherein the receiver's tuner receives a normal or high level television signal. As shown, the picture carrier is positioned at point 10 on one slope of the curve H and about 6 db (decibels) down from the peak response at 12. The chroma subcarrier is positioned at 14 on the opposite slope of the curve H and also about 6 db down from the peak response.

Under low level signal conditions, the curve H is conventionally modified as shown by curve L wherein the picture carrier is elevated to a point at or near the modified peak response. In addition, the bandwidth of the curve L is substantially narrowed in comparison to the curve H.

Figure 2:
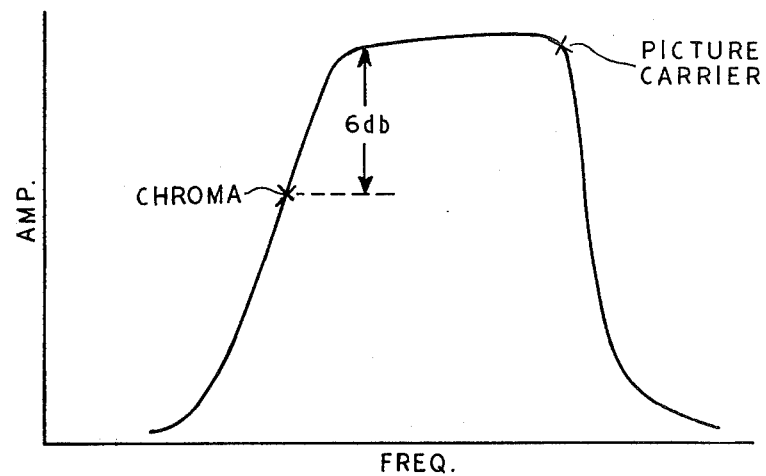
FIG. 2 illustrates a preferred IF frequency response characteristic under low level signal conditions.

As stated above, in accordance with this invention it has been found that picture quality is improved when the picture carrier is elevated to the peak response of the IF bandpass characteristic under low signal level conditions without substantially narrowing the IF frequency response. This preferred result is depicted in FIG. 2. As shown, under low level signal conditions, the chroma subcarrier remains located at a point approximately 6 db down from the peak response and the picture carrier is elevated to a point at or near the peak response. The bandwidth of the response shown in FIG. 2 is substantially greater than that of the curve L in FIG. 1 and provides superior results in terms of a reproduced television image under low level signal conditions.

Figure 3:
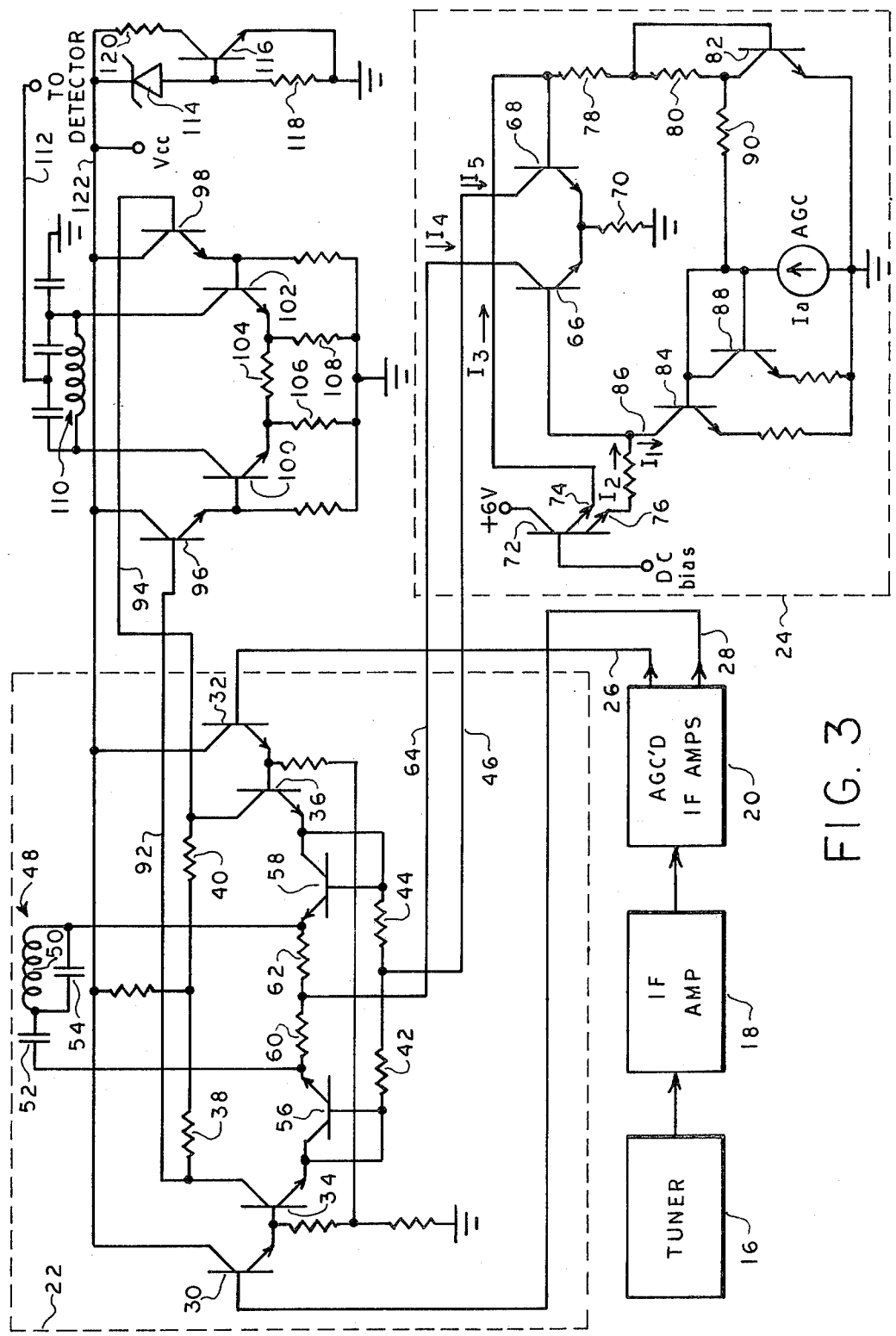
FIG. 3 is a circuit diagram of a preferred IF walking circuit according to the invention for developing the IF frequency response characteristic shown in FIG. 2.

A circuit which operates to provide the conventional IF response of FIG. 1 under high level signal conditions (curve H) and the modified response of FIG. 2 under low level signal conditions is illustrated in FIG. 3 in association with conventional television receiver components. As shown, a tuner 16 receives television signals and converts the latter signals to IF signals for application to an IF amplifier 18. The latter amplifier is tuned to provide an If frequency response as shown in curve H of FIG. 1 and may take the form of a SWIF (surface wave integratable filter) or other conventional tuning elements. Where the IF amplifier is in the form of a SWIF, it may also include one or more stages of wide band gain following the SWIF.

The output of the IF amplifier 18 is followed by an AGC (automatic gain control) amplifier 20 for providing an IF output whose level remains substantially constant irrespective of changes in the level of the signal received by the tuner. Of course, the tuner 16 may also include AGC capability in addition to that provided by the amplifier 20.

The receiver components described thus far may be conventional. Suffice it to say that the IF signals provided at the output of the AGC amplifier have been selectively amplified according to a frequency response characteristic similar to that shown in curve H of FIG. 1, irrespective of the level of the signal received by the tuner.

To modify the frequency response of curve H and to provide a frequency response as shown in FIG. 2 under conditions where the tuner receives a low level signal, a dual mode amplifier 22 and a current steering network 24 are provided. Briefly, the amplifier 22 provides a wide band frequency response under high level signal conditions and provides a frequency response whose peak is at or near the IF frequency of the picture carrier under low level signal conditions. When the amplifier 22 is operating under low level signal conditions, its frequency response, when added to the response of the IF amplifier (curve H), provides an over-all response as shown in FIG. 2.

The two modes (high and low level signal conditions) described above are current-selected by the current-steering network 24 as described in detail hereinafter.

Referring again to the amplifier 22, it may receive IF signals via leads 26 and 28 which apply the IF signals differentially to a pair of emitter followers 30 and 32. IF signals developed at the emitters of the latter transistors are coupled to the bases of transistors 34 and 36 which are connected as a differential amplifier. Resistors 38 and 40, coupled to the collectors of transistors 34 and 36, provide a load impedance across which the IF signals are amplified.

To control the gain of the amplifier 22 under high level signal conditions, the latter amplifier includes a first selectable gain-degeneration impedance which has a relatively constant high impedance at IF frequencies, including the IF frequency of the picture carrier. In addition, the first degeneration impedance is coupled in the amplifier 22 such that the amplifier's gain is dependent on the ratio of its load impedance to the first degeneration impedance when the latter impedance is selected to control the gain of the amplifier.

In the illustrated embodiment, that first degeneration impedance preferably takes the form of a pair of series connected resistors 42 and 44 coupled between the emitters of the transistors 34 and 36. The junction between the resistors 42 and 44 is coupled to a lead 46 to provide a path for current through the resistors 42 and 44 under high level signal conditions. Thus, when current flows in the lead 46, the resistors 42 and 44 are selectively placed in circuit with the emitters of the transistors 34 and 36. Hence, the gain of the amplifier 22 is a function of the ratio of the load impedances 38 and 40 to the resistors 42 and 44. In practice, the impedances 38 and 40 are of substantially the same value, and the resistors 42 and 44 are substantially matched in value.

Because the impedance of the resistors 42 and 44 is not frequency dependent, the amplifier 22 operates as a wide band amplifier under high level signal conditions. Therefore, the bandpass defined by the IF amplifier 18 is not modified by the amplifier 22 when the gain of the amplifier is determined by the resistors 42 and 44.

To modify the gain of the amplifier 22 under low level signal conditions, a second selectable gain-degeneration impedance is included which has a relatively lower impedance at the IF frequency of the picture carrier. The latter impedance is also coupled in the amplifier 22 such that, when it is selected to be in circuit, the gain of the amplifier 22 is a function of the ratio of its load impedance to the second degeneration impedance.

In the embodiment shown in FIG. 2, the second degeneration impedance includes a tuned circuit 48 coupled between the emitters of transistors 34 and 36. The tuned circuit 48 may include a coil 50 serially coupled with a capacitor 52, the values of the coil 50 and the capacitor 52 being selected to provide series resonance and, hence, a low impedance, at the IF frequency of the picture carrier. Another capacitor 54 may be coupled across the coil 50 as shown to lower the value of the coil 50 needed to achieve series resonance with the capacitor 52.

The second degeneration impedance also preferably includes a diode-connected transistor 56 coupling one end of the tuned circuit 48 to the emitter of the transistor 34, and another diode-connected transistor 58 coupling the other end of the tuned circuit 48 to the emitter of the transistor 36. Conventional diodes may, of course, be used in place of the transistors 56 and 58. However, because the amplifier 22 is designed for construction in integrated circuit form, diode-connected transistors are readily available for such use. Hereinafter, the term "diode" is used to include a "diode-connected transistor" for brevity.

The second degeneration impedance also preferably includes a pair of serially connected resistors 60 and 62 coupled in parallel with the tuned circuit 48. The junction between the resistors 60 and 62 is coupled to a lead 64 which, under low level signal conditions, carries a current for selecting the second degeneration impedance to be operatively in circuit within the amplifier 22.

Assuming now that the tuner 16 receives high level signals from an antenna (not shown), the lead 46 carries a D.C. selection current and the lead 64 carries no current. With no current in the lead 64, the diodes 56 and 58 are off, thereby operatively disconnecting the second degeneration impedance from the amplifier 22. The current carried by the lead 46 provides operating current for the transistors 34 and 36, which current flows from the emitters of the transistors 34 and 36, through the resistors 42 and 44, and thence to the lead 46. In this condition, the amplifier 22 provides wide band gain for IF signals from the AGC amplifier 20 and does not, therefore, substantially alter the IF frequency response.

When the tuner 16 receives low level signals, the current previously carried by the lead 46 is switched to the lead 64. Now the resistors 60 and 62 provide a path for steering current to the diodes 56 and 58 which are thus turned on for placing the tuned circuit 48 in circuit with the transistors 34 and 36. The operating current of the transistors 34 and 36 flows from the emitters of the transistors 34 and 36, through the diodes 56 and 58, the resistors 60 and 62, and thence to the lead 64. Because the tuned circuit 48 is now in circuit with the amplifier 22, and because it provides a relatively low impedance at the IF frequency of the picture carrier, the gain of the amplifier 22 is substantially raised at the frequency of the picture carrier. At frequencies beyond the bandpass of the tuned circuit 48, the resistors 60 and 62, along with resistors 42 and 44, substantially determine the emitter degeneration of the transistors 34 and 36 and hence, the gain of the amplifier 22. Therefore, the degree to which the amplifier 22 modifies the IF frequency response is a function of the ratio of the impedance of the tuned circuit 48 at the IF frequency of the picture carrier to the impedance of the resistors 60 and 62 in parallel with resistors 42 and 44. In practice, satisfactory performance has been obtained by selecting the values of the resistors 60 and 62 to be equal to each other and to the values of the resistors 42 and 44. A Q of approximately 50 has been found to be satisfactory for the tuned circuit 48. In addition, the coil 50 may have an inductance of 4 microhenries, the capacitors 48 and 54 may have capacities of 2 picofarads each, and the resistors 42, 44, 60 and 62 may be 680 ohms each.

As stated above, the steering circuit 24 controls the current carried by the leads 46 and 64. To indicate to the steering circuit when high level and low level signals are received by the tuner, a source of AGC current $I_a$ is fed to the steering current. As is conventional, the level of the AGC current is representative of the level of the signal received by the tuner. When the level of the AGC current indicates that a high level is received, the steering circuit 24 causes a predetermined D.C. current to be steered into the lead 46. Conversely, when the AGC currents indicate that a low level signal is received, the steering circuit steers that predetermined D.C. current through the lead 64.

Specifically, the steering circuit 24 includes a pair of transistors 66 and 68 connected as a differential amplifier with a common emitter resistor 70. The latter transistors are caused to respond to the level of the AGC current $I_a$ for generating currents $I_4$ and $I_5$ in the leads 64 and 46. The ratio of the currents $I_4$ and $I_5$ is variable but their sum remains substantially constant in order to provide the transistors 34 and 36 with a constant D.C. operating current.

As shown, the bases of transistors 66 and 68 receive currents $I_2$ and $I_3$, respectively. By altering the ratio of $I_2$ and $I_3$ in response to variations in the value of the AGC current, the ratio of the currents $I_4$ and $I_5$ is varied accordingly. To achieve such variations in the latter currents, $I_2$ $I_3$ are generated by a transistor having a pair of emitters 74 and 76. The emitter 74 is connected to the base of the transistor 68 and to series connected resistors 78 and 80. The junction of the latter resistors is coupled to the base of a further transistor 82 whose function is described hereinafter.

Because the current-generating transistor 72 receives a fixed D.C. base bias, and because the load (resistors 78 and 80) coupled to the emitter 74 is relatively constant, the current $I_3$ tends to remain substantially constant. However, the current $I_2$ is varied to vary the ratio of the currents $I_2$ and $I_3$ and, therefore, the ratio of the currents $I_4$ and $I_5$.

To vary the current $I_2$, a transistor 84 is provided with its collector coupled to the base of the transistor 66 via a lead 86, the latter of which carries a current $I_1$. The base of the transistor 84 is coupled in the illustrated current-mirror configuration with another transistor 88, the base and collector of which are both coupled to the AGC current $I_a$. With this arrangement, the current $I_1$ is proportional to $I_a$; $I_1 = KI_a$ where K is a proportioning factor. Also, the current $I_2$ is approximately equal to the current $I_1$ because of the low base current associated with the transistor 66. Hence, $I_2$ approximately equals $KI_a$. Further, the illustrated arrangement wherein the double-emitter transistor 72 drives a differential amplifier causes the currents $I_4$ and $I_5$ to be related to the currents $I_2$ and $I_3$ by the expression: $I_4/I_5 = I_3/I_2$. Because $I_2$ approximately equals $KI_a$, $I_4/I_5 = I_3/KI_a$. Hence, altering the value of the AGC current $I_a$ alters the ratio of $I_4$ to $I_5$.

Specifically, when $I_a$ increases, $I_4$ decreases and $I_5$ increases. When $I_a$ increases sufficiently, $I_4$ is reduced to zero and $I_5$ reaches its maximum value wherein the resistors 42 and 44 are in circuit and the second degeneration impedance including the tuned circuit 48 is out of circuit. When $I_a$ decreases sufficiently (low level signal conditions), $I_5$ is reduced to zero and $I_4$ is increased to its maximum value. Then the tuned circuit 48 is in circuit and the resistors 42 and 44 are operatively out of circuit.

Referring again to the transistor 82, its collector is coupled via a resistor 90 to the AGC current source and to the base of the transistor 88. Because the transistor 82 operates in saturation, the base of the transistor 88 is held at a low voltage when a very low level of AGC current is present. Under that condition, the transistors 84 and 88 are off. As the level of AGC current begins to increase, it flows through the resistor 90 to the collector of the transistor 82. When the level of AGC current increases sufficiently the voltage drop across the resistor 90 is sufficient to bias the transistors 84 and 88 on. At that point, the ratio of the currents $I_4$ and $I_5$ begins to change. Hence, the resistor 90 and the transistor 82 determine the point at which "walking" is to occur.

With the illustrated combination of the dual-mode amplifier 22 and the steering circuit 24, the over-all IF frequency response is changed in response to changes in the AGC signal. Other circuitry may, of course, be employed for selecting between the two modes of operation for the amplifier 22. However, the circuit 24 is preferable because it is easily integratable and provides consistent, reproducible current steering.

The output of the amplifier 22 may be amplified further by any conventional amplifier. For example, leads 92 and 94 may be connected to the load resistors 38 and 40 as shown for differentially driving a pair of emitter followers 96 and 98. A pair of transistors 100 and 102 are connected with resistors 104, 106 and 108 in a differential amplifier configuration for amplifying the signals received from the emitter followers 96 and 98. A load in the form of a low Q tuned circuit 110 may be coupled to the collectors of the transistors 100 and 102 to enhance their gain. The output of the tuned circuit 110 may be coupled via a lead 112 to a detector for detecting the information contained in the IF signal.

Regulated low voltage for the circuitry shown in FIG. 3 may be obtained by connecting a zener diode 114, a transistor 116, and resistors 118 and 120 as shown to a higher voltage supply and by coupling the zener diode 114 to a voltage bus 122. The bus 122 supplies a regulated low voltage to the illustrated circuit components.

Among the advantages of the IF walking circuit described above, the most significant is that the picture carrier is elevated to the peak of the IF bandpass characteristic in a consistent, repeatable manner utilizing a circuit which is easily manufactured in integrated circuit form. All the components of the amplifier 22 and the steering circuit 24 (excepting the tuned circuit 48) are easily integrated using conventional technology. Because of the ease with which the walking circuit is integrated, and because of the few non-integratable components which are used, the walking circuit is relatively inexpensive. Moreover, if it should be desired to remove the "walking" capability of the amplifier 22, the tuned circuit 48 may be merely removed.

Although the invention has been described in terms of a preferred structure, it will be obvious to those skilled in the art that many alterations and variations thereto may be made without departing from the invention. For example, the tuned circuit 48 may be repalced by a crystal filter. Also, where single-ended rather than differential drive is desired, one of the transistors 34, 36 and its associated emitter and load impedances may be eliminated. By way of example, the transistor 36, diode 58 and resistors 40, 44 and 62 may be eliminated, and the leads 46 and 64 coupled to resistors 42 and 60 as illustrated in FIG. 3. In that case, the transistor 34 would receive a single-ended IF signal drive, and by-pass capacitors should be coupled between ground and the leads 46 and 64. The single-ended output of the transistor 34 would be taken across its load resistor 38.

Other alterations and modifications will be apparent to those skilled in the art in light of the foregoing description. Accordingly, it is intended that all such alterations and modifications be included within the spirit and scope of the invention as defined by the appended claims.

What is claimed is:

1. In a television receiver having an IF section which processes IF signals having a picture carrier component and which substantially determines the IF frequency response of the receiver under normal signal conditions, a circuit for modifying the IF frequency response under low level signal conditions, comprising:
an amplifier having an IF signal input and a load impedance across which the IF signal is amplified;
a first selectable gain-degeneration impedance having a relatively constant impedance at IF frequencies, including the frequency of the picture carrier;
a second selectable gain-degeneration impedance having a relatively lower impedance at the frequency of the picture carrier, said degeneration impedances being coupled to said amplifier such that the amplifier's gain is dependent on the ratio of its load impedance to the selected degeneration impedance and such that each of said first and second impedances is selectable in response to a current being steered therethrough; and
means responsive to the receiver receiving a relatively high level television signal for steering current through said first degeneration impedance so as to effect wideband gain of said amplifier, and responsive to the receiver receiving a relatively low level television signal for steering current through said second degeneration impedance so as to effect increased gain at the frequency of the picture carrier,
whereby the receiver's IF frequency response is substantially unaltered when high level television signals are received and the frequency response is altered when low level television signals are received so as to provide increased gain at the frequency of the picture carrier.

2. A circuit as set forth in claim 1 wherein said second degeneration impedance includes a frequency-selective network having a relatively low impedance at the frequency of the picture carrier.

3. A circuit as set forth in claim 2 wherein said frequency-selective network comprises a capacitance serially coupled with an inductance.

4. A circuit as set forth in claim 1 wherein said amplifier includes a pair of transistors connected as a differential amplifier, wherein said first degeneration impedance includes a pair of resistors serially coupled between the emitters of said transistors, and wherein said second degeneration impedance includes a tuned circuit coupled between the emitters of said transistors.

5. A circuit as set forth in claim 4 wherein said tuned circuit is serially coupled to the emitter of one of said transistors by a diode and serially coupled to the emitter of the other transistor by another diode, and wherein said second degeneration impedance further includes a pair of serially connected resistors coupled in parallel with said tuned circuit, whereby under high level signal conditions, the resistors in said first degeneration impedance determine the amplifier's gain over a wide frequency range, and at low signal levels the resistors in the second degeneration impedance provide a path for steering current to the diodes for placing the tuned circuit in circuit with the differential amplifier, whereupon the tuned circuit determines the amplifier's gain at the frequency of the picture carrier under low level signal conditions.

6. A circuit as set forth in claim 5 wherein said current steering means includes a pair of transistors connected as a differential amplifier having first and second collector outputs, said first output being coupled to said first degeneration impedance for steering current therethrough and said second output being coupled to said second degeneration impedance for steering current therethrough.

7. A circuit as set forth in claim 6 wherein said first output is coupled to a junction between the serially coupled resistors of said first degeneration impedance and said second output is coupled to a junction between the serially connected resistors of said second degeneration impedance.

8. In a television receiver having an IF section which processes IF signals having a picture carrier component and which substantially determines the IF frequency response of the receiver under normal signal conditions, a circuit for modifying the IF frequency response under low level signal conditions, comprising:
a pair of transistors connected as a differential amplifier having an IF signal input and a load impedance across which the IF signal is amplified;
a first pair of serially connected resistors coupled between emitters of said transistors;
a series tuned circuit resonant at the IF frequency of the picture carrier;
a first diode coupling said tuned circuit to the emitter of one of said transistors and a second diode coupling said tuned circuit to the emitter of the other of said transistors;

a source of an automatic gain control signal whose value is representative of the level of the IF signal; and a current steering network responsive to the value of the automatic gain control signal being representative of a high level IF signal for steering current to a junction between said serially connected resistors, and responsive to the value of the automatic gain control signal being representative of a low level IF signal for steering current through said diodes, whereby at high levels of the IF signal the gain of the differential amplifier is wideband, and at low levels of the IF signal the gain of the differential amplifier is maximum at the IF frequency of the picture carrier, thereby modifying the IF frequency response only at low levels of the IF signal.

9. A circuit as set forth in claim 8 further including a second pair of serially connected resistors coupled between said diodes and in parallel with said tuned circuit, whereby the latter resistors provide a path for steering current to the diodes when low level IF signals occur.

10. A circuit as set forth in claim 9 wherein said current steering network includes a pair of transistors connected as a differential amplifier having a pair of collector outputs, one of said outputs being connected to a junction between said first pair of serially connected transistors and the other of said outputs being connected to a junction between said second pair of serially connected resistors.

* * * * *